United States Patent
Shao et al.

(10) Patent No.: US 7,097,009 B2
(45) Date of Patent: Aug. 29, 2006

(54) FRICTION MATERIAL CONFIGURATION AND METHOD OF MANUFACTURE FOR BRAKE APPLICATIONS

(75) Inventors: Xinming Shao, Rochester Hills, MI (US); Sunil Kesavan, Farmington Hills, MI (US)

(73) Assignee: Akebono Corporation (North America), Farmington Hills, MI (US)

( * ) Notice: Subject to any disclaimer, the term of this patent is extended or adjusted under 35 U.S.C. 154(b) by 0 days.

(21) Appl. No.: 10/696,934

(22) Filed: Oct. 30, 2003

(65) Prior Publication Data

US 2005/0092562 A1   May 5, 2005

(51) Int. Cl.
*F16D 69/00* (2006.01)

(52) U.S. Cl. .............. 188/251 A; 188/251 M; 188/250 G; 188/250 B

(58) Field of Classification Search ........... 188/251 R, 188/255, 257, 258, 251 A, 251 M, 250 H, 188/250 G, 250 B See application file for complete search history.

(56) References Cited

U.S. PATENT DOCUMENTS

| 174,898 | A | | 3/1876 | Congdon |
|---|---|---|---|---|
| 2,355,419 | A | * | 8/1944 | Bruce ..................... 188/251 R |
| 2,554,548 | A | | 5/1951 | Albagnac |
| 2,713,923 | A | * | 7/1955 | Eksergian et al. ...... 188/251 A |
| 2,718,936 | A | | 9/1955 | Rohrer et al. |
| 3,766,130 | A | | 10/1973 | Johnson |
| 4,315,563 | A | * | 2/1982 | Hayashi et al. ............ 188/73.1 |
| 4,351,421 | A | | 9/1982 | Kurata et al. |
| 4,485,898 | A | * | 12/1984 | Bracken et al. ......... 188/250 B |
| 4,926,978 | A | * | 5/1990 | Shibata et al. ............. 188/73.1 |
| 5,073,099 | A | | 12/1991 | Kayano |
| 5,158,165 | A | * | 10/1992 | Flotow ................... 192/107 R |
| 5,503,257 | A | * | 4/1996 | Sugita et al. ........... 188/251 R |
| 5,964,324 | A | | 10/1999 | Maehara |
| 6,244,396 | B1 | * | 6/2001 | Lumpkin ................ 188/250 B |
| 6,672,433 | B1 | * | 1/2004 | Yamaguchi et al. .... 188/251 A |
| 2001/0005547 | A1 | | 6/2001 | Hikichi |
| 2002/0012783 | A1 | | 1/2002 | Hikichi et al. |

(Continued)

FOREIGN PATENT DOCUMENTS

EP    0 106 782    4/1984

(Continued)

OTHER PUBLICATIONS

Blau, Peter J., "compositions, Functions, and Testing of Friction Brake Materials and Their Additives", prepared by the Oak Ridge National Laboratory, Document No. ORNL/TM-2001.64.

*Primary Examiner*—Devon Kramer
(74) *Attorney, Agent, or Firm*—Harness, Dickey & Pierce P.L.C.

(57) ABSTRACT

The present invention provides a brake pad or shoe and method to manufacture the same. The brake pad or shoe includes a first friction material such as a non-asbestos organic material and a second friction material such a semi-metallic material. The friction materials are configured as discrete buttons or other suitable shapes and connected to a structural backing of the brake pad or shoe in a spaced-apart configuration. The first friction material may be located at an outboard location of the structural backing and the second friction material may be located at an inboard location. Use of the two friction materials provides superior performance compared to use of a single friction material. Configuring the friction material as discrete buttons makes the friction material fabrication process independent of the structural backing configuration, which reduces complexity and cost.

17 Claims, 4 Drawing Sheets

U.S. PATENT DOCUMENTS

2003/0106749 A1 * 6/2003 Yamaguchi et al ........ 188/73.1

FOREIGN PATENT DOCUMENTS

| EP | 1 528 280 | | 5/2005 |
| FR | 2 734 875 | | 12/1996 |
| GB | 1078368 | | 9/1967 |
| JP | 63 190942 | | 8/1988 |
| JP | 63190942 | | 8/1988 |
| JP | 07-151172 | | 6/1995 |
| JP | 8210395 | | 8/1996 |
| WO | WO84/01412 | * | 4/1984 |
| WO | WO 02/073059 | | 9/2002 |

* cited by examiner

FRICTION MATERIAL CONFIGURATION AND METHOD OF MANUFACTURE FOR BRAKE APPLICATIONS

FIELD OF THE INVENTION

The present invention provides friction materials for brake applications and more particularly relates to a configuration and a method of manufacture for friction materials used in disc and drum brake applications.

BACKGROUND OF THE INVENTION

Automotive brake systems must satisfy a certain set of consumer expectations such as comfort, durability and reasonable costs. These expectations are translated into a set of specific requirements for the brake system such as a high and stable friction coefficient, vibration and noise characteristics within a predetermined limit, and low wear rates for the friction material and rotor mating services. All of the aforesaid requirements have to be achieved simultaneously at a reasonable cost. Particularly, the performance has to be stable under varying application conditions over extremes in temperature, humidity, speed, and deceleration rate for occasional or many consecutive stops.

Friction materials serve in a variety of ways to control the acceleration and deceleration of vehicles and machines. The friction materials may be resin or rubber bound composites based on asbestos, metallic fibers, or combinations of other organic or inorganic fibers. The friction material is generally composed of binders, reinforcements and fillers.

Brake linings and clutch facings include friction materials which are employed to convert the kinetic energy of the moving vehicle or a machine part into heat to remove the kinetic energy and help the movement of the vehicle or machine part. Typically, the friction material absorbs the heat and gradually dissipates it into the atmosphere. The friction material is considered to be an expendable portion of the disc brake pad, which over a long period of use is converted to wear debris and gases.

Varying formulations of friction materials are frequently employed to enhance predetermined characteristics such as increasing the strength of a friction material, providing varying degrees of wear resistance, heat dissipation, temperature stabilization, and/or high and low temperature friction performance.

Other formulations are also used to provide an abrasive attribute to a friction material. The magnitude of the abrasiveness of the friction material dictates many performance and wear characteristics of the braking system. To that end, extreme abrasiveness will lead to excellent performance but contribute to excessive wear of braking components. Insufficient abrasiveness may protect braking components or provide relatively poor braking characteristics.

It is desirable to maximize the beneficial attributes of some friction material formulations while minimizing the less optimal attributes of the same formulation. It is also desirable to use multiple formulations to maximize the beneficial attributes of the multiple formulations by minimizing the less optimal attributes of the same multiple formulations. It is further desirable to manufacture multiple friction material members with multiple friction material formulations using the same method of manufacture for installation onto the disc pad.

SUMMARY OF THE INVENTION

The present invention provides a brake pad or shoe having a structural backing and a method to manufacture the same. The brake pad or shoe includes a first friction material that is configured as first friction elements. The disc brake pad also includes a second friction material configured as second friction elements. The first friction elements are spaced from the second friction elements and both are connected to the structural backing.

In a preferred form of the present invention, the first friction material is a non-asbestos organic material and the second friction material is a semi-metallic material. The first friction material may be located at an outboard location of the structural backing and the second friction material may be located at an inboard location of the structural backing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description, the appended claims, and the accompanying drawings, wherein:

DETAILED DESCRIPTION OF THE PRESENT INVENTION

Figure 1:
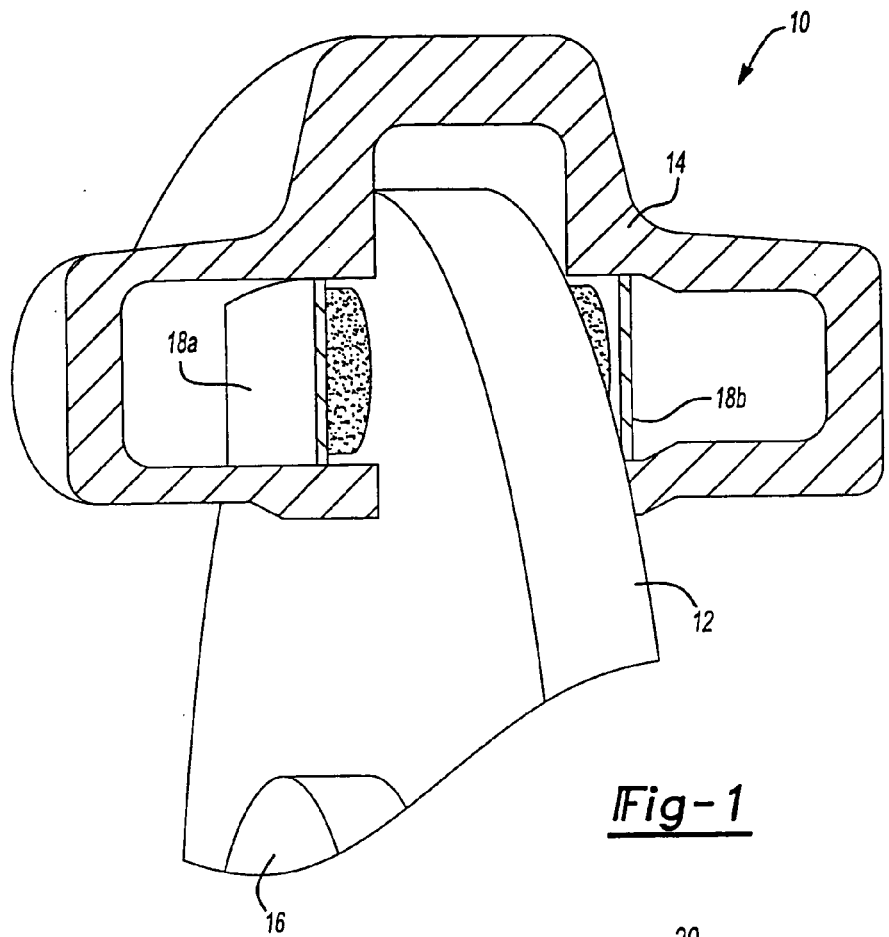
FIG. 1 is a cross-sectional view of an exemplary disc brake system constructed in accordance with the teachings of the present invention.

In FIG. 1, a preferred embodiment of the present invention is shown with reference to a simplified and exemplary vehicle disc brake system 10. The disc brake system 10 includes a rotor 12, a caliper 14 and a hub 16. The disc brake system 10 also includes a pair of outboard and inboard brake elements 18a and 18b, respectively referred to hereinafter as brake elements, pads, or shoes 18. The brake elements 18 are mounted to the caliper 14. One skilled in the art will readily appreciate that the brake system 10 is shown in a simplified fashion. As such, a more detailed explanation of an exemplary disc brake system is shown in commonly assigned U.S. Pat. No. 4,351,421, titled Disc Brake filed Jul. 18, 1980, which is hereby incorporated by reference as if fully set forth herein. It will be appreciated that the present invention may also be incorporated into a drum brake application. As such, a more detailed explanation of an exemplary drum brake system is shown in commonly assigned U.S. Pat. No. 5,964,324, titled Drum Brake filed Oct. 17, 1997, which is hereby incorporated by reference as if fully set forth herein.

The brake elements 18 include a structural backing 20 and a plurality of friction members 22 mounted to the structural backing 20. It should be noted that the friction members 22 may be referred to as the friction material members 22, the friction elements 22, or the friction material elements 22. It will be appreciated that there are many methods to mount the friction members 22 to the structural backing 20 of the brake element 18. Some such mounting methods will be discussed further. Notwithstanding, an exemplary method is disclosed in commonly assigned U.S. Pat. No. 5,073,099, titled Hot Press for Heat Forming a Disc Pad, filed Apr. 18, 1990, which is hereby incorporated by reference as if fully set forth herein.

The brake elements 18 squeeze against the rotor 12 to slow the rotation of the rotor 12 to thereby slow the vehicle (not shown) to a desired speed. In a drum brake application (not illustrated but known by one skilled in art), the brake elements are pushed against a brake drum to slow the vehicle. It will be appreciated that the brake element 18 or the structural backing 20 may be commonly referred to as a brake pad, a brake shoe, or a brake lining, depending on the application or the industry. As noted above, friction is produced when the plurality of the friction members 22 come into contact with the rotor 12. This, in turn, causes the friction members 22 of the brake elements 18 to heat up and ultimately wear.

Figure 2:
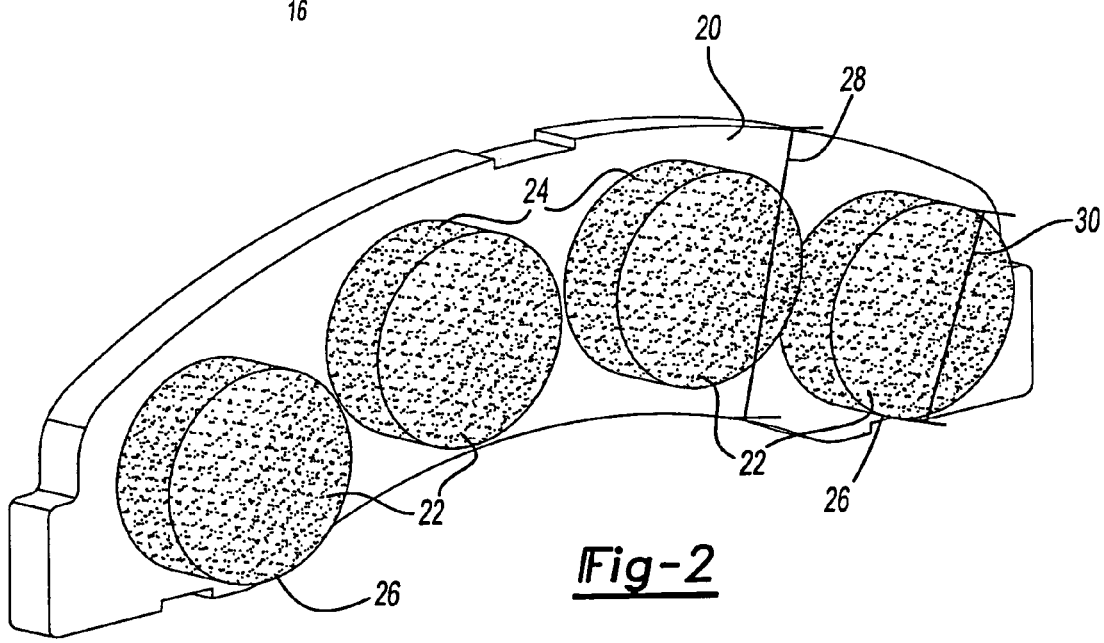
FIG. 2 is a perspective view of a brake element of FIG. 1 showing a plurality of friction material members.
Figure 3:
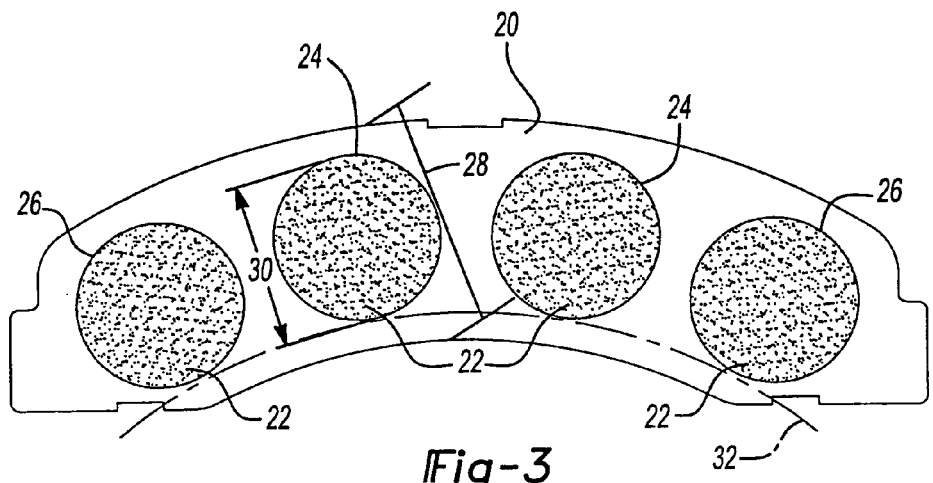
FIG. 3 is a front view of the brake element of FIG. 2.

With reference to FIGS. 2 and 3, the plurality of the friction members 22 are comprised of a binder, a filler and a reinforcement which may be combined in slurry form, for example, and pressed or molded into a suitable shape. Suitable shapes may include but are not limited to small rectangular members or small circular discs. In the present invention, the plurality of the friction members 22 are fabricated into small circular discs similar in shape to a button but obviously different in configuration and material. It will be appreciated that the plurality of the friction materials 22 may be constructed in any suitable shape and connected to the structural backing 20 in many different ways. The plurality of the friction members 22 may be constructed in a button shaped circular disc; however, other shapes may be used that will not render the present invention inoperable but may reduce optimal performance or increase cost and complexity.

In the present invention, the plurality of the friction members 22 is arranged on the structural backing 20 in a spaced-apart configuration. The plurality of the friction members 22 may be sized so that a diameter 30 of each of the friction members 22 is about 95% of a shortest dimension 28 of the structural backing 20. The spaced-apart configuration provides, among other things, improved cooling over a conventional solid piece of friction material affixed to the structural backing 20, as air is able to circulate around the plurality of the friction members 22. It will be appreciated that the friction members 22 may be configured in many different sizes and placed in various locations on the structural backing 20. It will be further appreciated that while FIG. 2 shows four of the friction members 22, the plurality of the friction members 22 may include more or less than four friction members.

With reference to FIG. 3, the plurality of the friction members 22 may be spaced from one another with about equal spacing. It will be appreciated that the friction members 22 may connected to the structural backing 20 along an arc 32 (illustrated as a broken line). The arc 32 represents a line of about equal radial distance from the hub 16 (FIG. 1), wherein placement of individual friction members 22 along the arc 32 positions the friction members 22 at an about equal distance from the hub 16 of the rotor 12 (FIG. 1). It will be further appreciated that the friction members 22 need not be positioned along the arc 32 or equally spaced, but may be arranged in any suitable configuration based on the individual assessment of the vehicle or friction material application.

Figure 4:
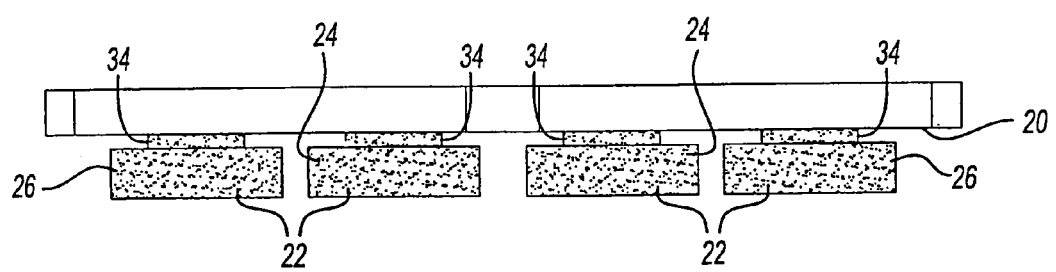
FIG. 4 is a side view of a brake element constructed in accordance with an alternative embodiment of the present invention showing an alternative configuration of the plurality of the friction members.

With reference to FIG. 4, the friction members 22 are shown spaced apart from one another and spaced from the structural backing 20 in accordance with an alternative embodiment of the present invention. Introduction of an optional spacer 34 between the structural backing 20 and each of the friction members 22 may promote improved cooling as air is able to move around and behind each of the friction members 22. It will be appreciated that the spacer may be constructed of the same material as the friction members 22 and may be fabricated as a unitary piece with the friction members 22. It will also be appreciated that the spacer 34 may be made of a different suitable material and mated with each of the friction members 22 during assembly of the brake element 18. The plurality of the friction members 22 may be attached to the structural backing 20 with many forms of bonding including but not limited to adhesives and mechanical fastening.

Figure 5A:
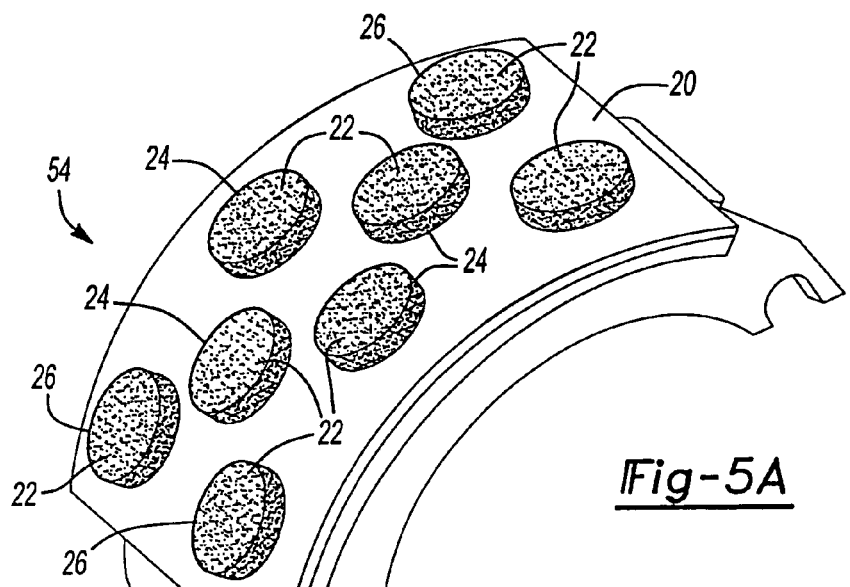
FIG. 5A is a perspective view of a brake element constructed in accordance with another alternative embodiment of the present invention showing an exemplary configuration of the plurality of the friction members mounted to a brake shoe.
Figure 5B:
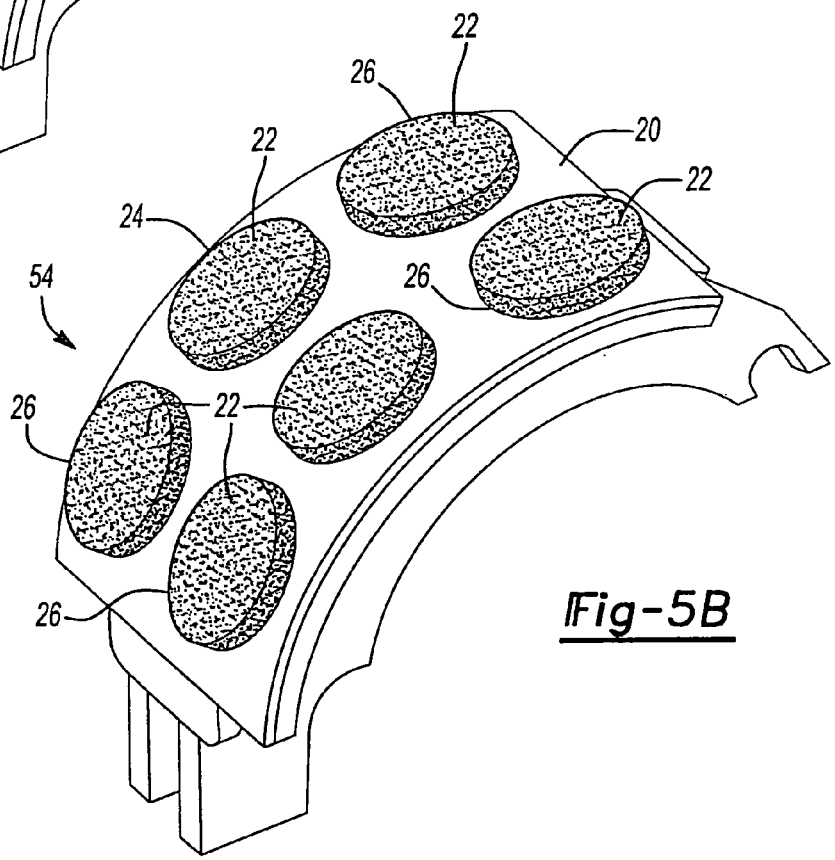
FIG. 5B is a perspective view of the brake element of FIG. 5A showing an alternative exemplary configuration of the plurality of friction materials mounted to the brake shoe.

With reference to FIGS. 5A and 5B, a brake shoe is illustrated in accordance with an alternative embodiment of the present invention and generally indicated by reference numeral 54. The plurality of the friction members 22 are shown spaced apart from one another and attached to the structural backing 20, which is configured as a portion of the brake shoe 54 for use in drum brake applications. FIGS. 5A and 5B illustrate non-limiting examples wherein eight and six of the friction members 22, respectively, are attached to the structural backing 20. The friction members 22 occupying the inboard location are indicated by reference numeral 24, while friction members occupying the outboard location are indicated by reference numeral 26. The friction members 22 illustrated in FIG. 5A are more numerous but smaller than the friction members 22 illustrated in FIG. 5B. Implementation of either configuration indicated in FIGS. 5A and 5B may be dictated by vehicle loading, brake specifications, or manufacturing concerns.

With reference to FIGS. 6A, 6B, 6C, and 6D, a truck brake pad is illustrated in accordance with an alternative embodiment of the present invention and generally indicated by reference numeral 56. The plurality of the friction members 22 are shown spaced apart from one another and attached to the structural backing 20, which is configured as a portion of the truck brake pad 56. The truck brake pad 56 is not limited to truck use only but may be implemented in any disc brake application that typically accommodates heavier vehicle weights.

Figure 6A:
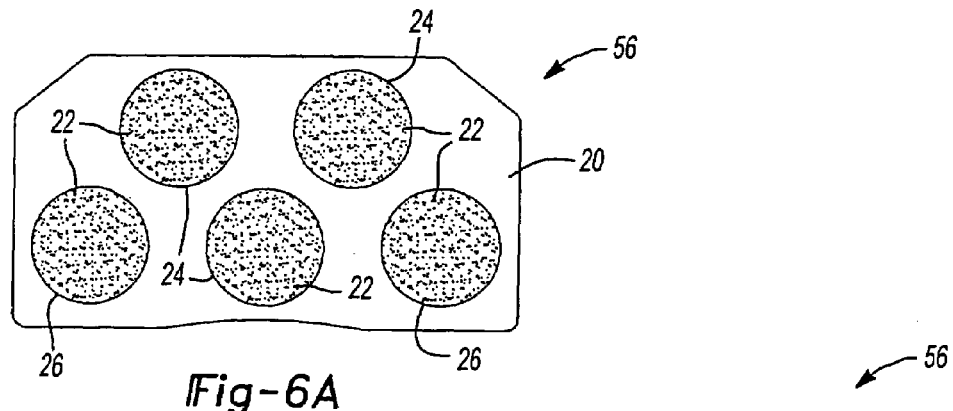
FIG. 6A is a front view of a brake element constructed in accordance with another alternative embodiment of the present invention showing an exemplary configuration of the plurality of friction materials mounted to a truck brake pad.
Figure 6B:
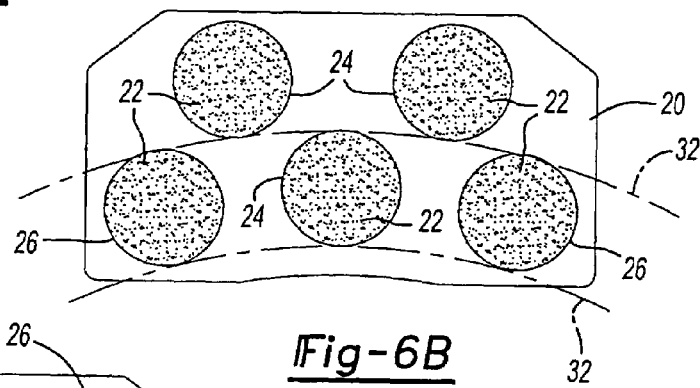
FIG. 6B is a front view of the brake element of FIG. 6A showing another alternative exemplary configuration of the plurality of friction materials mounted to the truck brake pad.
Figure 6C:
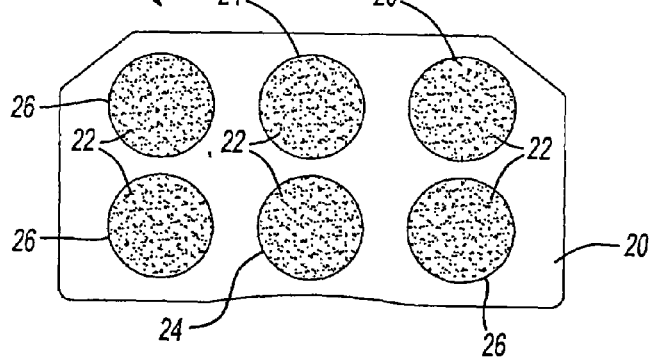
FIG. 6C is a front view of the brake element of FIG. 6A showing another alternative exemplary configuration of the plurality of friction materials mounted to the truck brake pad.
Figure 6D:
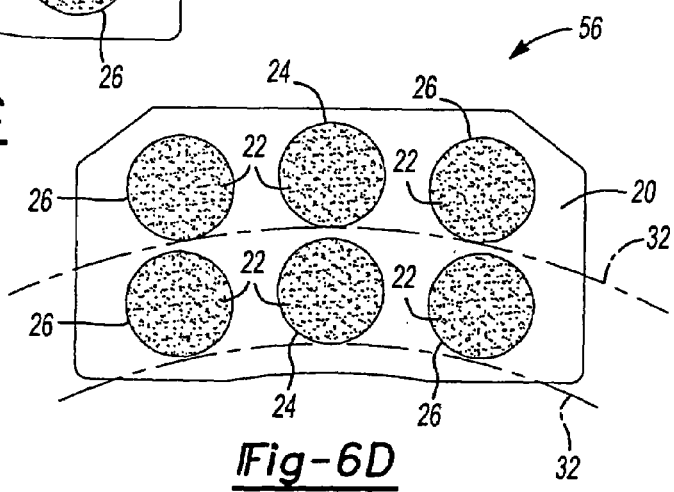
FIG. 6D is a front view of the brake element of FIG. 6A showing another alternative exemplary configuration of the plurality of friction materials mounted to the truck brake pad.

FIGS. 6A and 6B illustrate non-limiting examples wherein five of the friction members 22 are attached to the structural backing 20. In FIG. 6A, the plurality of the friction members 22 are aligned in generally horizontal rows. FIG. 6B, in contrast, illustrates the plurality of the friction members 22 positioned along the arc 32, illustrated as a broken line. The arc 32 represents a line of about equal radial distance from the hub 16 (FIG. 1), wherein placement of individual friction members along the arc 32 positions the friction members 22 at an about equal distance from the hub 16 of the rotor 12 (FIG. 1). FIGS. 6C and 6D are similar to FIGS. 6A and 6B, respectively, but include six of the friction members 22, which are configured to have smaller diameters but have larger spacing therebetween when compared to the friction members illustrated in FIGS. 6A and 6B.

The friction members 22 occupying the inboard location are indicated by reference numeral 24, while friction members occupying the outboard location are indicated by reference numeral 26. Implementation of any configuration of the friction members 22 may be dictated by vehicle loading, brake specifications, or manufacturing concerns. It will be appreciated that the friction members 22 that have been illustrated hitherto and throughout the Figures have been illustrated as fixedly attached to the structural backing 20. In another alternative embodiment of the present invention, however, the plurality of the friction members 22 may be configured to be releaseably attached to the structural backing 20. As such, individual friction members 22 may be moved around the structural backing 20 to accommodate the needs of certain niche markets or consumers, such as but not limited to autocross or other specialized vehicle performance markets. To that end, the consumer may alter either the position, quantity, or formulation of the plurality of the friction members 22 by either adding, removing or substituting other individual friction members 22.

In accordance with an alternative embodiment of the present invention, the plurality of friction members 22 may be formed in shapes that correspond to an indicia of source. To be more specific, individual friction members 22 may take the shape of well known logos and designs but still be used within the brake element 18. For example, the friction member may resemble logos from Ford®, such as the Blue Oval®, or logos from Chevrolet, Honda, or Akebono. It will be appreciated that the individual friction members may be shaped as, or embossed with, various logos to cater to the desires of the consumer.

In the present invention, the plurality of the friction members 22 includes at least two material configurations. More specifically, the friction members 22 occupying the outboard location 26 on the structural backing 20 have a first material configuration. The friction members 22 that occupy the inboard location 24, in turn, have a second material configuration. While configurations may change from the inboard location 24 to the outboard location 26, the friction members 22 are configured with approximately the same dimensions regardless of the material configuration. It will be appreciated that the first material configuration and the second material configuration have about the same hardness.

In the present invention, a less aggressive friction material is employed in the outboard location 26, while more aggressive friction material is employed in the inboard location 24. The less aggressive friction material, for example, may be a non-asbestos organic (NAO) friction material. The more aggressive friction material, for example, may be a semi-metallic or low steel friction material. It will be appreciated that many friction material configurations are available and various applications may require use of one material configuration over another. In addition, some applications may require use of more than two material configurations on the structural backing 20.

The exemplary configurations of the NAO friction material and the semi-metallic friction material discussed below may be used on the same structural backing 20 to take advantage of the desirable characteristics of both configurations, while reducing the manifestations of their undesirable characteristics. Some exemplary desirable characteristics of the NAO friction material are an overall reduction of rotor aggressiveness, noise creep, groan, and friction variation, when compared to an exclusive semi-metallic configuration. The semi-metallic configuration, in turn, provides exemplary desirable characteristic such as increased high temperature resistance and increased friction at a given pressure, when compared to an exclusive NAO friction material.

Using both the NAO friction material and the semi-metallic friction material on the same structural backing provides a superior friction material, when compared to the sole use of either the NAO friction material or the semi-metallic friction material. Empirical data appears to confirm this result, when the NAO friction material is located at the outboard location 26 and the semi-metallic friction material is located at the inboard location 24. Use of the friction material, configured as disclosed, appears to have produced little to no disc thickness variation. A friction material utilizing only a semi-metallic formulation, however, appears to have generated over thirty micrometers of disc thickness variation after two-hundred hours of testing.

Disc thickness variation (or DTV) refers to non-uniform thickness of the disc rotor. DTV may be caused by many different things one of which includes intermittent rubbing between the brake element and the rotor when the caliper is not engaged (brake pedal is not pressed) because the braking element has not fully disengaged the rotor. A rotor with disc thickness variation will transmit a pulsing sensation as the braking element intermittently makes contact with the rotor.

Additional empirical results suggest reduced noise manifestation when the NAO friction material is in the outboard location 26 and the semi-metallic friction material is in the inboard location 24. In this configuration, while conducting a noise test similar to the Society of Automotive Engineers J2521 test, about 4% noise was recorded with a maximum noise of about ninety-seven decibels. When the NAO friction material was moved to the inboard location 24 and the semi-metallic friction material was moved to the outboard location 26, the same test produced about 25% noise with a maximum noise of about one hundred twenty-five decibels.

It will be appreciated that 4% and 25% noise, respectively, refers to the approximate percentage of test results where the noise produced by the test had surpassed a pre-determined noise threshold. In the test discussed above, the noise threshold was about 70 dB. It follows, therefore, if one hundred tests were performed, for example, four or twenty-five tests, respectively, produced enough noise to surpass the exemplary 70 dB noise threshold.

Table 1 shows a preferred exemplary composition of an exemplary NAO material, where the values found in the column labeled "Preferred Example Percentages of Total Weight" are total weight percentages for each component of the exemplary NAO friction material.

TABLE 1

| Components of an Exemplary Non-Asbestos Organic Friction (NAO) Material | Preferred Example Percentages of Total Weight |
|---|---|
| Phenolic Resin | about 8 |
| Cashew Friction Dust | about 4 |
| Rubber | about 4 |
| Organic Fiber | about 3 |
| Copper Powder/Fiber | about 7 |
| Ceramic Fiber | about 4 |
| Barium Sulfate | about 23 |
| Potassium Titanate Fiber | about 16 |
| Mineral Fiber | about 4 |
| Calcium Hydroxide | about 3 |
| Mica | about 3 |
| Zircon | about 8 |
| Magnesium Oxide | about 4 |
| Antimony Sulfide | about 2 |
| Graphite/Coke | about 7 |

Table 2 shows a preferred exemplary composition of an exemplary semi-metallic friction material, where the values found in the column labeled "Preferred Example Percentages of Total Weight" are total weight percentages for each component of the exemplary semi-metallic friction material. It will readily be appreciated that the values outlined above in Table 1 and Table 2 are exemplary values and, as such, do not limit the scope of the present invention.

TABLE 2

| Components of an Exemplary Semi-Metallic Friction Material | Preferred Example Percentages of Total Weight |
|---|---|
| Phenolic Resins | about 3 |
| Rubber | about 1 |
| Cashew Friction Dust | about 2 |
| Ground Tread Rubber | about 1 |
| Iron or Steel Fibers | about 20 |
| Organic Fibers | about 1 |
| Metal Oxides | about 6 |
| Iron Powders | about 18 |
| Coke/Graphite | about 28 |
| Zinc Powders | about 2 |
| Barium Sulfate | about 12 |
| Other Functional Fillers | about 6 |

In the present invention, the binder for the friction material is a phenolic resin. The friction material components are subjected to a surface treatment with the phenolic resin. The substances subjected to such a surface treatment have an advantage that they can be easily mixed with other materials when the friction materials 22 are manufactured. In an alternative implementation of the present invention, a silane coupling agent can be used in lieu of the phenolic resin. Further detail as to use and substitution of the phenolic resin, the silane coupling agent, or other suitable binders are more fully discussed in commonly assigned pending U.S. patent application Ser. No. 09/735,625, titled Friction Material, filed Dec. 14, 2000, which is hereby incorporated by reference as if fully set forth herein.

In the present invention, another component of the friction material is the filler. Exemplary fillers include antioxidants, asbestos, barium sulfate, calcium carbonate, calcium hydroxide, cashew nut oil, cashew friction dust, cotton, fiber of mixed oxides, lime, potassium titanate, diene rubber, nitrile rubber, scrap rubber, sea coal, and zinc oxide among others. One skilled in the art will readily appreciate the wide ranging the availability of suitable filler materials. A more detailed list of possible and exemplary fillers is disclosed in Compositions, Functions, and Testing of Friction Brake Materials and their Additives by Peter J. Blau (prepared by the Oak Ridge National Laboratory, Document Number ORNL/TM-2001.64), which is incorporated by reference in its entirety as if fully set forth herein.

One skilled in art will readily appreciate that many vendors supply various commercially available organic fibers, such as Aramid® fibers, that are suitable for use in the friction materials 22. In the present invention, one such exemplary organic fiber is a Kevlar® Fiber, which is commercially available from DuPont, 5401 Jefferson Davis Hwy, Richmond, Va. 23234, among others.

One skilled in art will readily appreciate that many vendors supply various commercially available ceramic fibers suitable for use in the friction materials 22. In the present invention, one such exemplary mineral fiber is a Superwool® Fiber, which is commercially available from Thermal Ceramics, P.O. Box 923, Dept. 167, Augusta, Ga. 30903, among others.

One skilled in art will readily appreciate that many vendors supply various commercially available forms of Barium Sulfate suitable for use in the friction materials 22. In the present invention, one such exemplary type of Barium Sulfate is CIMBAR® 325, which is commercially available from Cimbar Performance Materials, 25 Old River Road, SE, Cartersville, Ga. 30120, among others.

One skilled in art will readily appreciate that many vendors supply various commercially available forms of potassium titanate fibers suitable for use in the friction materials 22. The composition, use, and production of potassium titanate is disclosed in commonly assigned pending U.S. patent application Ser. No. 09/735,625, which is already incorporated by reference. The composition of flakey or powdery potassium titanate is disclosed in commonly assigned pending U.S. patent application Ser. No. 09/739,291, titled Friction Material, filed Dec. 19, 2000, which is hereby incorporated by reference as if fully set forth herein.

One skilled in art will readily appreciate that many vendors supply various commercially available mineral fibers suitable for use in friction materials 22. In the present invention, one such exemplary mineral fiber is a Lapinus® Fiber, which is commercially available from Lapinus Fibres B.V., 6040 KD Roermond, The Netherlands, under the trade name Roxul® 1000.

One skilled in art will readily appreciate that many vendors supply various commercially available forms a Mica, Zircon, Calcium Hydroxide, Magnesium Oxide, and Antimony Sulfide suitable for use in friction materials 22. It will be appreciated that Zircon is a zirconium silicate. These various commodities are commercially available through Universal Minerals, Inc. 4620 S. Coach Drive, Tucson, Ariz. 85714 or Domfer Metal Powders, Ltd. 1550, Boulevard de Maisonneuve Ouest, Montréal, QC H3G 1N2, among others.

One skilled in art will readily appreciate that many vendors supply multiple commercially available forms of graphite or coke suitable for use in the friction materials 22. In the present invention, one such exemplary source of suitable commercially available graphite or coke is from Asbury Carbons, Inc., 405 Old Main Street, Asbury, N.J., 08802, or Superior Graphite Co., 10 S. Riverside Plaza, Chicago Ill. 60606, among others.

One skilled in art will readily appreciate that many vendors supply various commercially available forms of iron fiber suitable for use in the friction materials 22. In the present invention, one such exemplary iron fiber is available from Sunny Metal Inc. 01, Jinxin Road, Nancun-Yuangang, Panyu, Guangzhou, China, 511442, which is commercially available under the product name Annealed Vibration Cutting Iron Fiber. A more detailed explanation of an exemplary iron fiber is disclosed in commonly assigned U.S. patent application Ser. No. 10/353,897, titled Pure Iron Fiber Based Friction Material Products, filed Jan. 29, 2003, which is hereby incorporated by reference as if fully set forth herein.

The plurality of the friction members 22 may be manufactured in many suitable shapes including but not limited to small rectangular members or small circular discs. In the present invention, the plurality of the friction members 22 is fabricated into small circular discs similar in shape to a button but obviously different in configuration and material. Manufacturing of each of the friction members 22 may be accomplished in many different ways. Regardless of the manufacturing method chosen, it will be appreciated that the manufacturing method is independent of the configuration of the structural backing 20. More specifically, the tooling configured to produce the friction members 22 need not account for size or type of the structural backing 20 as the friction members 22 are mounted at a later time. As such, production and tooling for the friction members 22 are independent of the structural backing, which reduces tooling complexity and cost.

The friction members 22 may be fabricated using a cold or warm forming or hot pressing. The friction member may also be extruded in a uniform shape and then cut to appropriately sized elements. The friction members may also be cut from a larger sheet of material into suitable shapes. Furthermore, the friction members may be fabricated by a combination of processes. It will be appreciated that regardless of the process used to produce the friction members 22, the process remains independent of the tooling required to make the structural backing 20.

Once the friction members 22 are produced, whether by the processes mentioned above or by any modified conventional process, the friction members 22 are attached to the structural backing 20. The friction members 22 may be attached with mechanical fasteners, suitable adhesives or any suitable modified conventional attachment process. Furthermore, the friction members 22 may be connected by a combination of processes. Regardless of the method selected to attach the plurality of the friction members 22 to the structural backing 20, the method and the process of fabrication remain independent of the configuration of the structural backing 20 or any other suitable attachment location.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A brake pad comprising:
 a backing member having a configuration adapted for coupling with an automotive vehicle brake;
 at least one first friction element formed from a first friction material being a non-asbestos organic material; and
 at least one discrete second friction element formed from a second friction material being a semi-metallic material, said at least one first friction element is spaced from said at least one discrete second friction element forming a gap between adjacent said first and second friction elements to prohibit said first and second friction elements from contacting one another to promote air flow around each of said friction elements, both of said friction elements being connected to the backing member to form the brake pad, said at least one first and said at least one second friction elements having desired configurations enabling multi-positioning and interchangeability irrespective of their orientation for positioning said at least one first and at least one second friction elements at several different positions on said backing member.

2. The brake pad of claim 1 wherein said at least one first friction element and said at least one second friction element are configured as a disc-shaped element and have about the same diameter.

3. The brake pad of claim 1 wherein said at least one first friction element is connected to an outboard location of the backing member and said at least one second friction element is connected to an inboard location of the backing member.

4. The brake pad of claim 1 wherein said non-asbestos organic material includes at least one of a phenolic resin, a silane coupling agent, a cashew friction dust, rubber, an organic fiber, a copper powder, a copper fiber, a ceramic Fiber, barium sulfate, a potassium titanate fiber, a mineral fiber, calcium hydroxide, mica, zircon, magnesium oxide, antimony sulfide, graphite, coke, and combinations thereof.

5. The brake pad of claim 1 wherein said semi-metallic material includes at least one of a phenolic resin, a silane coupling agent, a cashew friction dust, rubber, an organic fiber, metal oxides, iron powder, barium sulfate, graphite, coke, and combinations thereof.

6. The brake pad of claim 1 wherein said first friction material is about the same hardness as said second friction material.

7. The brake pad of claim 1 wherein said at least one first friction element and said at least one second friction element are fixedly attached and spaced from the backing member to promote air flow behind each of said friction elements.

8. The brake pad of claim 1 wherein said at least one first friction element and said at least one second friction element are releaseably attached to the backing member to enable reconfiguration of said friction elements.

9. The brake pad of claim 1 wherein said at least one first friction element and said at least one second friction element are configured to resemble an indicia of source.

10. A method of manufacturing brake pads or shoes comprising:
 fabricating a plurality of discrete friction members, said plurality of discrete friction members include at least one first friction member having a first material configuration and at least one second friction member having a second material configuration, said first material configuration is a non-asbestos organic material, and said second material configuration is a semi-metallic material; and
 connecting said plurality of said friction members in a spaced-apart formation onto a structural backing, such that said at least one first and said at least one second friction members enabling multi-positioning and interchangeability irrespective of their orientation for positioning said at least one first and at least one second friction member at several different positions on said structural backing; and arranging said friction members to provide gaps between the members for prohibiting contact of the friction members for promoting air flow around each of said friction members.

11. The method of claim 10 wherein said plurality of said friction members are configured as disc-shaped members.

12. The method of claim 11 wherein said friction members have about the same diameter.

13. The method of claim 10 wherein said plurality of said friction members are configured as rectangular-shaped members.

14. The method of claim 13 wherein said friction members have about the same dimensions.

15. The method of claim 10 further comprising connecting said at least one first friction member to an outboard location of the structural backing.

16. The method of claim 15 further comprising connecting said at least one second friction member to an inboard location of the structural backing.

17. The method of claim 10 further comprising configuring said plurality of said friction members to resemble an indicia of source.

* * * * *